(12) United States Patent
Fullerton et al.

(10) Patent No.: US 7,670,696 B2
(45) Date of Patent: *Mar. 2, 2010

(54) PERPENDICULAR MAGNETIC RECORDING MEDIUM WITH PATTERNED MAGNETIC ISLANDS AND NONMAGNETIC TRENCHES AND MANUFACTURING METHOD FOR SUPPRESSING SURFACE DIFFUSION OF TRENCH MATERIAL

(75) Inventors: Eric E. Fullerton, San Diego, CA (US); Olav Hellwig, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 402 days.

This patent is subject to a terminal disclaimer.

(21) Appl. No.: 11/743,140

(22) Filed: May 1, 2007

(65) Prior Publication Data
US 2008/0274381 A1 Nov. 6, 2008

(51) Int. Cl.
*G11B 5/66* (2006.01)
(52) U.S. Cl. ..................... 428/834; 427/130
(58) Field of Classification Search ............ None
See application file for complete search history.

(56) References Cited

U.S. PATENT DOCUMENTS

| | | | |
|---|---|---|---|
| 4,137,141 A | 1/1979 | Henry et al. | |
| 5,372,843 A | 12/1994 | Miyamura et al. | |
| 5,571,591 A | 11/1996 | Brady et al. | |

(Continued)

FOREIGN PATENT DOCUMENTS

JP 4089620 3/1992

(Continued)

OTHER PUBLICATIONS

Moritz et al., "Patterned Media Made From Pre-Etched Wafers: A Promising Route Toward Ultrahigh-Density Magnetic Recording", IEEE Transactions on Magnetics, vol. 38, No. 4, Jul. 2002, pp. 1731-1736.

(Continued)

*Primary Examiner*—Holly Rickman
(74) *Attorney, Agent, or Firm*—Thomas R. Berthold (57) ABSTRACT

A patterned perpendicular magnetic recording medium of the type that has spaced-apart pillars with magnetic material on their ends and with trenches between the pillars that are nonmagnetic regions is made with a method that allows use of a pre-etched substrate. A nonmagnetic capping layer is located in the trenches above the nonmagnetic regions. The substrate has diffusion material in the trenches that when heated will diffuse into the magnetic recording layer material and chemically react with it. The pillars are formed of material that will not diffuse into the recording layer. The recording layer is formed over the entire substrate and a nonmagnetic capping layer that is not chemically reactive with the diffusion material is formed over the recording layer in the trenches. The substrate is annealed to cause the recording layer material in the trenches and the material in the substrate to diffuse into one another and chemically react to render the trenches nonmagnetic. The capping layer suppresses the diffusion of material from the substrate to the surface in the trenches and thus prevents migration of diffusion material to the recording layer material on the ends of the pillars.

19 Claims, 7 Drawing Sheets

U.S. PATENT DOCUMENTS

| | | | |
|---|---|---|---|
| 5,585,140 | A | 12/1996 | Brady et al. |
| 5,587,223 | A | 12/1996 | White |
| 5,820,769 | A | 10/1998 | Chou |
| 5,858,474 | A | 1/1999 | Meyer et al. |
| 5,900,729 | A | 5/1999 | Moser et al. |
| 6,331,364 | B1 | 12/2001 | Baglin et al. |
| 6,383,597 | B1 | 5/2002 | Fullerton et al. |
| 6,440,520 | B1 | 8/2002 | Baglin et al. |
| 6,660,413 | B1 | 12/2003 | Thangaraj et al. |
| 6,754,017 | B2 | 6/2004 | Rettner et al. |
| 7,067,207 | B2 | 6/2006 | Kamata et al. |
| 2005/0122609 | A1* | 6/2005 | Albrecht et al. ............... 360/55 |
| 2006/0269797 | A1* | 11/2006 | Lu et al. .................... 428/834 |
| 2007/0026265 | A1* | 2/2007 | Sakurai et al. ........... 428/848.3 |
| 2007/0087227 | A1* | 4/2007 | Ma et al. ................. 428/833.1 |

FOREIGN PATENT DOCUMENTS

JP        2004062995        2/2004

OTHER PUBLICATIONS

Hu et al., "Magnetic and recording properties of Co/Pd islands on prepatterned substrates", J. Appl. Phys., vol. 95, No. 11, Part 2, Jun. 1, 2004, pp. 7013-7015.

Terris et al., "Topical Review: Nanofabricated and self-assembled magnetic structures as data storage media", J. Phys. D: Appl. Phys. 38 (2005) R199-R222.

* cited by examiner

PERPENDICULAR MAGNETIC RECORDING MEDIUM WITH PATTERNED MAGNETIC ISLANDS AND NONMAGNETIC TRENCHES AND MANUFACTURING METHOD FOR SUPPRESSING SURFACE DIFFUSION OF TRENCH MATERIAL

BACKGROUND OF THE INVENTION

1. Field of the Invention

This invention relates generally to patterned perpendicular magnetic recording media, such as disks for use in magnetic recording hard disk drives, and more particularly to patterned disks wherein the data bits are stored on elevated magnetic data islands isolated from one another by recessed nonmagnetic regions.

2. Description of the Related Art

Magnetic recording hard disk drives with patterned magnetic recording media have been proposed to increase data density. In patterned media the magnetic recording layer on the disk is patterned into small isolated data islands arranged in concentric data tracks. Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer. To produce the required magnetic isolation of the patterned data islands, the magnetic moment of the spaces between the islands must be destroyed or substantially reduced to render these spaces essentially nonmagnetic. In one type of patterned media, the data islands are elevated, spaced-apart pillars that extend above the disk substrate surface to define troughs or trenches on the substrate surface between the pillars. This type of patterned media is of interest because substrates with the pre-etched pattern of pillars and trenches can be produced with relatively low-cost, high volume processes such as lithography and nanoimprinting. The magnetic recording layer material is then deposited over the entire surface of the pre-etched substrate to cover both the ends of the pillars and the trenches. It was believed that because the trenches were recessed they would be far enough from the read/write head to not adversely affect reading or writing. This type of patterned media is described in U.S. Pat. No. 6,440,520, and by Moritz et al., "Patterned Media Made From Pre-Etched Wafers: A Promising Route Toward Ultrahigh-Density Magnetic Recording", *IEEE Transactions on Magnetics*, Vol. 38, No. 4, July 2002, pp. 1731-1736. This type of patterned media with perpendicular magnetization on the pillar ends is believed to provide opportunity for ultra-high density magnetic recording. However, it has been discovered that the magnetic material in the trenches creates noise in the readback signal and also adversely affects writing the individual data bits (i.e., magnetizing the recording material on the pillar ends).

Pending application Ser. No. 11/558,846 filed Nov. 10, 2006, and assigned to the same assignee as this application, describes a patterned perpendicular magnetic recording medium that allows use of a pre-etched substrate with patterned pillars. The substrate has material in the trenches that diffuses into the magnetic recording layer material in the trenches during an annealing process. The diffusion material chemically reacts or interdiffuses with one or more of the elements in the recording layer material to render the trenches nonmagnetic or with significantly reduced magnetic moment. The time and temperature of the annealing process needs to be carefully controlled to assure there is no adverse effect on the recording layer material on the pillars.

What is needed is a patterned perpendicular magnetic recording medium with trenches rendered nonmagnetic by chemical reaction of diffusion material and recording layer material, and a manufacturing process that prevents any chemical reaction of the diffusion material with the recording layer material on the pillars.

SUMMARY OF THE INVENTION

The invention is a patterned perpendicular magnetic recording medium of the type that has spaced-apart pillars with magnetic material on their ends and with trenches between the pillars that are nonmagnetic regions. A nonmagnetic capping layer is located in the trenches above the nonmagnetic regions. The medium is made with a method that allows use of a pre-etched substrate. The substrate has a generally planar surface at the trenches and comprises diffusion material, such as silicon (Si) or germanium (Ge), that when heated will diffuse into the magnetic recording layer material and chemically react with one or more of the elements typically used in the recording layer, such as cobalt (Co), iron (Fe), platinum (Pt), palladium (Pd) and nickel (Ni). The substrate may be a semiconductor-grade single-crystal Si wafer or a rigid support structure or base with an amorphous Si layer. The pillars that extend from the planar surface are formed of a material that will not diffuse into the recording layer. Such materials include a silicon oxide such as $SiO_2$, a silicon nitride (SiN), alumina ($Al_2O_3$), and refractory metals and their alloys, e.g., tungsten (W), molybdenum (Mo), niobium (Nb), tantalum (Ta), and rhenium (Re). The recording layer is then formed over the entire substrate so as to cover both the pillar ends and the trenches. Next, a nonmagnetic capping layer is deposited on the recording layer in the trenches and optionally on the sidewalls of the pillars and on the recording layer material on the ends of the pillars. The capping layer is formed of material that will not substantially chemically react with the diffusion material. The substrate is then heated to an elevated temperature and for a time sufficient to cause the recording layer material in the trenches and the material in the substrate to diffuse into one another and chemically react. This results in the destruction or at least substantial reduction of any ferromagnetism in the recording layer material in the trenches, meaning that the trenches exhibit no significant magnetic moment after exposure to an applied magnetic field. However, the heating does not affect the recording layer on the ends of the pillars because the pillars are formed of a material that will not diffuse into the recording layer. The presence of the capping layer during the annealing process suppresses the diffusion of material from the substrate to the surface in the trenches. Because this diffusion material cannot reach the surface it is not mobile and cannot migrate along the pillar sidewalls to the recording layer material on the ends of the pillars. The capping layer eliminates the need for precise control of the annealing process and thus makes it a robust process for manufacturing. Additionally it enables the annealing to be at higher temperatures and/or for longer times.

The substrate may also include a "soft" or relatively low-coercivity magnetically permeable underlayer (SUL) to provide a magnetic flux return path for the magnetic field from the write head. If a SUL is used, then a diffusion barrier is formed on the SUL beneath the surface from which the pillars extend to prevent diffusion between the Si or Ge of the substrate and the magnetic material in the SUL.

In another embodiment, the substrate has a first diffusion barrier with a generally planar surface from which the pillars extend, with the pillars being formed of Si or Ge. A second diffusion barrier is located on the pillar ends beneath the recording layer. The diffusion barriers may be a material, such as Ta or SiN, that prevents diffusion between the Si or Ge in the pillars and the recording layer material. During heating of the substrate, the recording layer material in the trenches and the Si or Ge in the pillars near the trenches diffuse into one another and chemically react to create nonmagnetic regions in the trenches. The second diffusion barrier on the ends of the pillars prevents diffusion between the Si or Ge of the pillars and the recording layer. If a SUL is used in this embodiment, the first diffusion barrier prevents diffusion between the Si or Ge of the pillars and the magnetic material in a SUL.

The patterned perpendicular magnetic recording medium of this invention may be implemented in a magnetic recording disk drive in which the pillars are pattered on the disk in an array of concentric circular data tracks.

For a fuller understanding of the nature and advantages of the present invention, reference should be made to the following detailed description taken together with the accompanying figures.

DETAILED DESCRIPTION OF THE INVENTION

Figure 1:
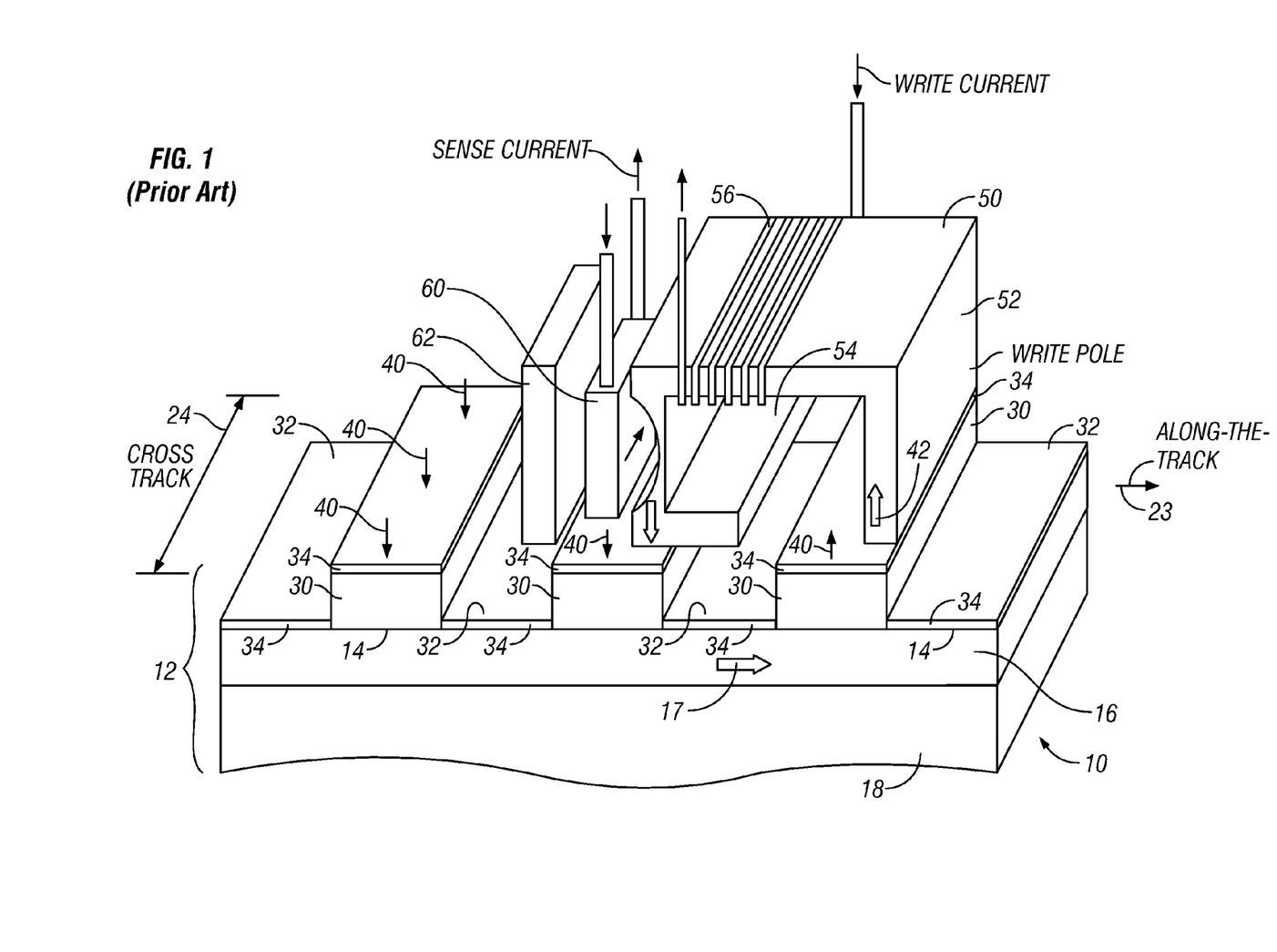
FIG. 1 is a schematic representation of a perpendicular magnetic recording system with a prior art patterned perpendicular medium.

FIG. 1 is a schematic representation of a prior art perpendicular magnetic recording system with patterned perpendicular media. The system can be implemented in a magnetic recording disk drive, with the medium being a magnetic recording disk with the patterned bits arranged into concentric circular data tracks. FIG. 1 thus shows a portion of a disk 10 that includes a substrate 12 with a generally planar surface 14. A plurality of discrete patterned islands or pillars 30 extend generally perpendicularly from the surface 14 and are part of substrate 12. The pillars 30 are spaced apart, leaving troughs or trenches 32 recessed below the ends of the pillars 30. A layer 34 of perpendicular magnetic recording material is formed on the ends of the pillars 30 as well as on surface 14 in the trenches 32. The recording layer 34 on each of the pillars 30 is magnetized perpendicularly, as depicted by arrows 40, resulting in the recorded bits being stored in the recording layer 34 in a generally perpendicular or out-of-plane orientation (i.e., other than parallel to the surface of the recording layer 34). In this type of patterned media, even though there is magnetic recording layer material in the trenches, the perpendicular spacing between the trenches and the ends of the pillars is the basis for isolating the recorded bits. However, as will be described below, the magnetic material in the trenches may still adversely affect reading and writing of the bits. As shown in FIG. 1, the substrate 12 may also include an optional "soft" or relatively low-coercivity magnetically permeable underlayer (SUL) 16 formed on a rigid disk support structure or base 18.

Also shown in the schematic of FIG. 1 is the read head 60 and the write head 50 (with write pole 52 and a return pole 54). Write current passes through a coil 56 of the write head 50 to generate a magnetic field (arrow 42) at the write pole 52. This magnetic field magnetizes the recording layer 34 on the pillar 30 beneath the write pole in the direction 40. The SUL 16 serves as a flux return path (arrow 17) for the magnetic field between the write pole 52 and the return pole 54 of the write head 50. The detection or reading of the recorded bits is by a read head 60, typically a magnetoresistive (MR) read head, such as a tunneling MR (TMR) read head in which a sense current passes perpendicularly through the layers making up the head. A shield 62 of magnetically permeable material may be used to prevent magnetizations from bits other than the bit being read from reaching the read head 60.

Figure 2:
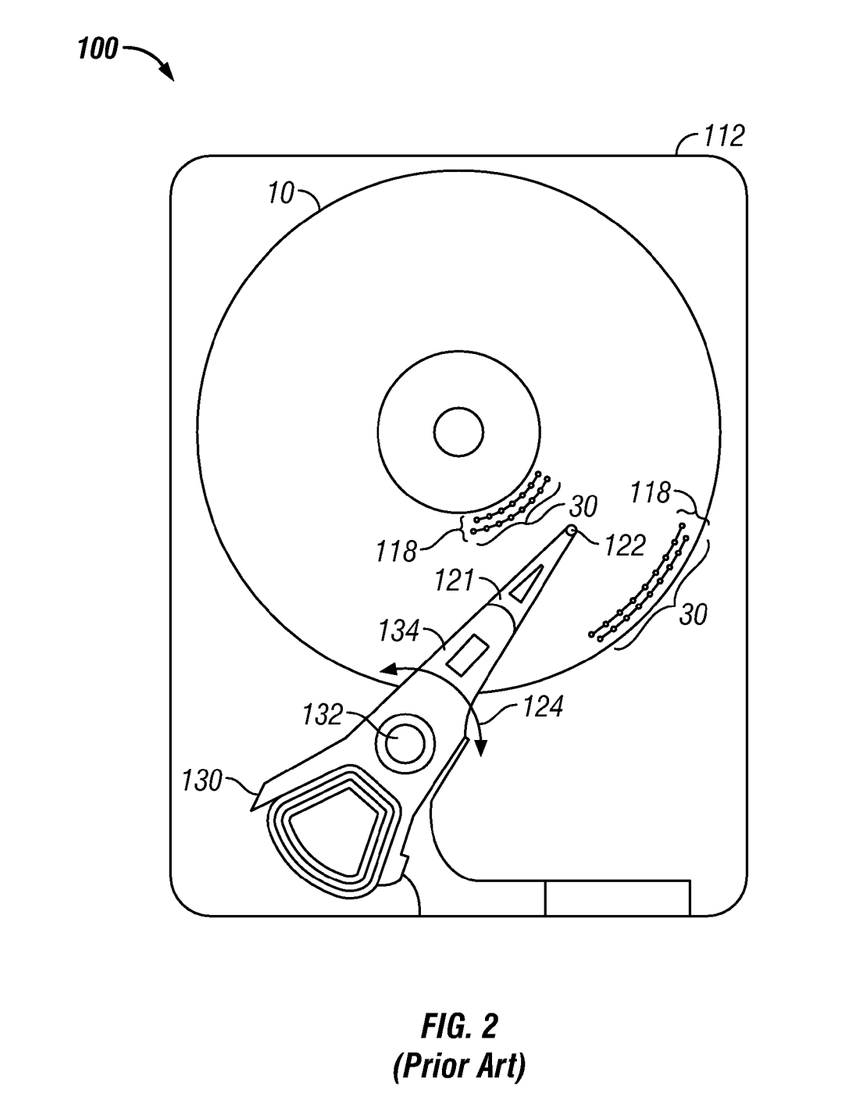
FIG. 2 is a top view of a disk drive implementation of the system illustrated in FIG. 1 and shows the patterned bits arranged in concentric circular data tracks.

FIG. 2 is a top view of a disk drive implementation of the system illustrated in FIG. 1. The drive 100 has a housing or base 112 that supports an actuator 130 and a drive motor for rotating the magnetic recording disk 10. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier 122, such as an air-bearing slider, attached to the other end of suspension 121. The suspension 121 permits the head carrier 122 to be maintained very close to the surface of disk 10. The read head 60 (FIG. 1) and write head 50 (FIG. 1) are typically formed as an integrated read/write head (not shown) patterned on the trailing surface of the head carrier 122. The pillars 30 on disk 10 are arranged in radially-spaced concentric circular data tracks 1 18. As the disk 10 rotates, the movement of actuator 130 allows the read/write head on the trailing end of head carrier 122 to access different data tracks 118 on disk 10. The writing on patterned media requires the synchronization of the write pulses with the pattern of pillars. A patterned media magnetic recording system that uses the magnetized pillars to clock the writing is described in U.S. Pat. No. 6,754,017 assigned to the same assignee as this application.

In the perpendicular magnetic recording system with the patterned disk 10 as shown in FIG. 1, only the perpendicular magnetic recording layer 34 on the ends of the pillars 30 contributes to the readback signal, with each pillar 30 representing one bit. The magnetic recording layer material that is located in the trenches 32 does not significantly contribute to the signal, but can act as a noise source. In addition, the magnetic material in the trenches may increase coupling of neighboring bits via direct exchange or indirectly via dipolar interactions, thus preventing or reducing the possibility of single-bit addressing during writing. The magnetic material in the trenches may also have a domain structure that generates undesired stray fields, which can cause uncontrolled switching of neighboring bits during writing. Thus even though the disk 10 can be fabricated with a relatively large perpendicular spacing between the ends of pillars 30 and the trenches 32, it is desirable to avoid magnetic material in the trenches to achieve maximum signal-to-noise ratio and optimal recording performance.

Figure 3A:
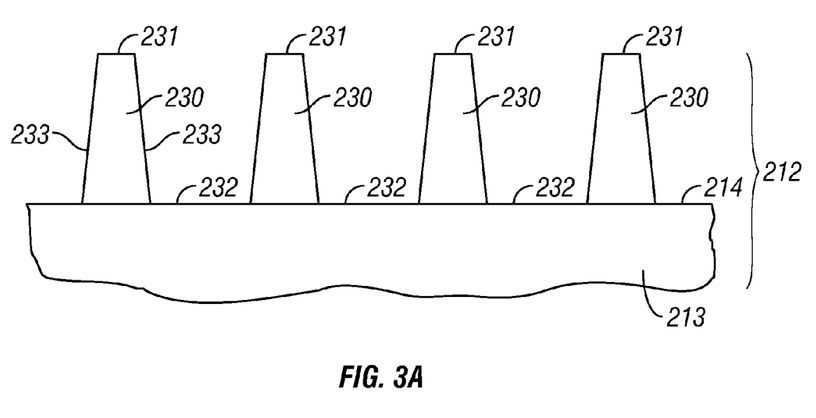
FIGS. 3A-3D are sectional views of a disk according to the invention at various stages
Figure 3B:
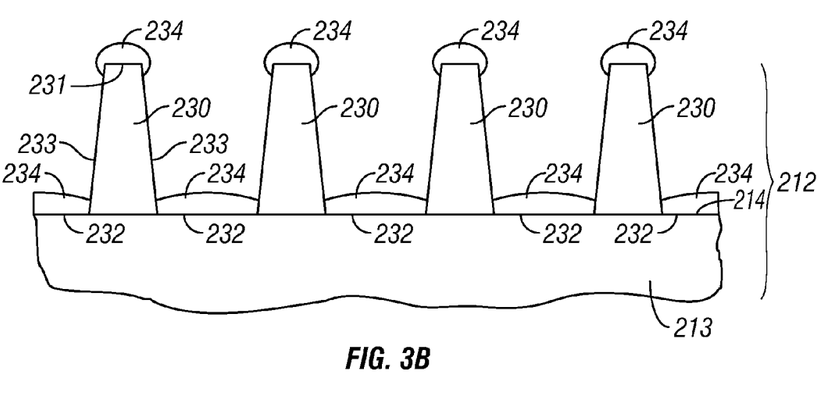
Figure 3C:
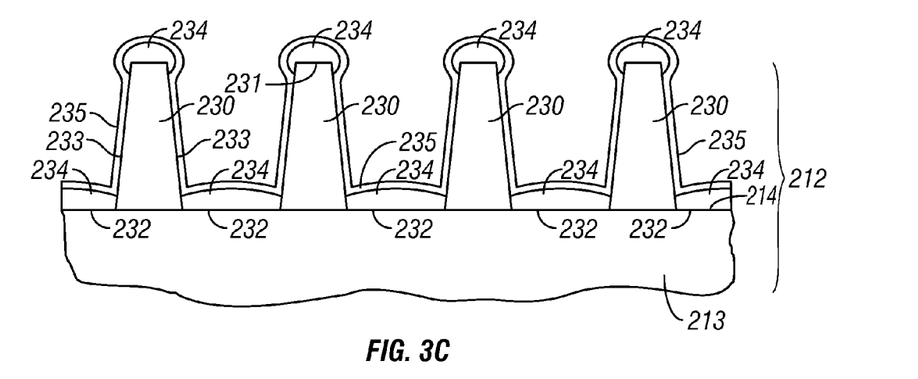

FIGS. 3A-3C are sectional views of a disk according to one embodiment of this invention at various stages of the manufacturing process. FIG. 3A shows one embodiment of a pre-etched substrate 212 with generally planar surface 214 and pillars 230 extending from surface 214. The pillars have tops or ends 231 that are generally coplanar and sidewalls 233. The regions between the pillars 230 at surface 214 are trenches 232. The substrate 212 includes a layer 213 of material, hereafter called "diffusion" material. The diffusion layer 213 is formed of a material that when heated is capable of diffusing into and chemically reacting with the recording layer material, which typically includes one or more elements such as Co, Fe, Pt, Pd and Ni. The preferred diffusion materials for layer 213 include Si and Ge. The pillars 230 are formed of a "non-diffusion" material, i.e., a material that when heated does not diffuse into or chemically react with the magnetic recording layer. The pillars 230 may thus be formed of a silicon oxide such as $SiO_2$, a silicon nitride (SiN), alumina ($Al_2O_3$), and refractory metals and their alloys, e.g., tungsten (W), molybdenum (Mo), niobium (Nb), tantalum (Ta), and rhenium (Re).

The pre-etched substrate 212 can be fabricated by any well-known technique, such as conventional lithography, direct-write electron-beam (e-beam) lithography, and nanoimprinting. For example, the substrate 212 may start as a rigid silicon wafer, such as a semiconductor-grade single-crystal silicon wafer, that serves as diffusion layer 213 with outer surface 214. Alternatively, the substrate 212 may be a rigid base onto which an amorphous Si layer is sputter deposited, with the amorphous Si layer serving as the diffusion layer 213 with outer surface 214. A non-diffusion layer of SiN or $SiO_2$ is then deposited or formed over the entire surface 214 to a thickness generally corresponding to the desired height for the pillars 230. For example, if the non-diffusion layer is $SiO_2$ it can be formed by thermal oxidation of the silicon wafer. Because the non-diffusion layer will be etched down to surface 214 to form the pillars 230, an optional etch-stop layer (not shown), such as a 2-3 nm thick film of carbon (C) or aluminum (Al), may be deposited over the entire surface 214 prior to deposition of the non-diffusion layer. The structure is then patterned and etched to remove the non-diffusion material, leaving the pattern of pillars 230 and trenches 232. A second etch is then used to remove the etch-stop material in the trenches 232.

In a nanoimprinting process, a master template is fabricated, typically by direct e-beam writing, to have the desired pattern. After the non-diffusion layer, e.g., $SiO_2$, is formed over the entire surface 214 of substrate 212, a thin film of imprint resist (i.e., a thermal plastic polymer) is spin coated onto the $SiO_2$ layer. Then the master template with its pre-defined pattern is brought into contact with the imprint resist film and the template and substrate are pressed together and heat is applied. When the resist polymer is heated above its glass transition temperature, the pattern on the template is pressed into the resist film. After cooling, the master is separated from the substrate and the patterned resist is left on the $SiO_2$ layer. Reactive-ion-etching (RIE) can be used to transfer the pattern in the resist to the underlying $SiO_2$ layer. The optional etch-stop layer would facilitate the termination of the RIE.

In a direct-write e-beam patterning process, after the non-diffusion layer, e.g., $SiO_2$, is formed over the entire surface 214 of substrate 212, a thin resist layer, such as poly-methyl-methacrylate (PMMA), can be deposited on the $SiO_2$ layer. The resist layer is then patterned with an e-beam tool. After this resist layer is developed, a pattern of holes is left in the resist layer. A thin chromium (Cr) layer can then be deposited into the holes and onto the patterned resist layer. In the following lift-off process, the remaining resist together with the Cr on top of it is removed, leaving a pattern of Cr dots. This pattern is transferred onto the $SiO_2$/Si by reactive ion etching (RIE) using the Cr dots as a hard mask. The optional etch-stop layer would facilitate the termination of the RIE. After the desired trench depth (i.e., the height of the pillars) is achieved, the Cr layer is removed and the substrate cleaned. The above-described nanoimprinting and direct-write e-beam patterning processes are well-known and described in further detail in numerous references, including G. Hu, et al., "Magnetic and recording properties of Co/Pd islands on prepatterned substrates", *J. Appl. Phys.*, Vol. 95, No. 11, Part 2, 1 Jun. 2004, pp. 7013-7015.

FIG. 3B is a sectional view of the substrate 212 after deposition of the magnetic recording layer 234. The deposition of magnetic recording layer 234 is typically by conventional sputter deposition and results in the material of the recording layer 234 being deposited on the ends of pillars 230 as well as in the trenches 232 at surface 214. The preferred recording layer 234 is a multilayer with perpendicular magnetic anisotropy, such as a Co/Pt, Co/Pd, Fe/Pt, Fe/Pd or Co/Ni multilayer. In a typical example, 4-10 films of Pd (each approximately 0.4 to 1.2 nm thick) and 4-10 films of Co (each approximately 0.2 to 0.5 nm thick) are alternately deposited to form a Co/Pd multilayer. Prior to the deposition of the multilayer it may be desirable to deposit an adhesion layer of a material that does not act as a diffusion barrier for Si with a thickness in the range of about 0.5 to 4 nm, and an initial Pd layer with a thickness in the range of about 0.5 to 4 nm. The thickness of the resulting structures is in the range of about 6 to 15 nm. The pillars 230 have a typical thickness of approximately 5 to 50 nm, with the centers of the pillars 230 being spaced apart by approximately 50 to 25 nm. This would result in the disk 10 having an areal bit density of approximately 250 to 1000 Gbits/in$^2$ In addition to a multilayer, the recording layer 234 may be formed of any of the known amorphous or crystalline materials and structures that exhibit perpendicular magnetic anisotropy. Thus, a granular polycrystalline cobalt alloy, such as a CoPt or CoPtCr alloy, with or without an oxide, such as oxides of Si, Ta, Ti, Nb, Cr, V and B, may be used. In addition, magnetic materials containing rare earth elements are useable, such as CoSm, TbFe, TbFeCo, GdFe alloys. The recording layer 234 can also be formed of chemically ordered CoPt, CoPd, FePt, FePd, $CoPt_3$ or $CoPd_3$. These chemically ordered alloys, in their bulk form, are known as face-centered tetragonal (FCT) $L1_0$-ordered phase materials (also called CuAu materials). The c-axis of the $L1_0$ phase is the easy axis of magnetization and is oriented perpendicular to the substrate. Like the Co/Pt and Co/Pd multilayers, these layers may exhibit very strong perpendicular magnetic anisotropy.

FIG. 3C is a sectional view of the substrate 212 after deposition of a nonmagnetic capping layer 235. The capping layer 235 is formed of a nonmagnetic material that prevents diffusion from the diffusion material, i.e., the diffusion material and the capping layer material are substantially immiscible. The capping layer material preferably does not substantially chemically react with the material in the diffusion layer 213 in the trenches 232. The preferred diffusion materials for layer 213 are Si or Ge. Thus the capping layer 235 may be formed of Ta, W, Mo, Nb, Re, and their alloys. Other materials include amorphous "diamond-like" carbon (including hydrogenated carbon and nitrogenated carbon), and alumina. Also, silicon nitrides (SiNx) and silicon oxides (SiOx), where the Si is chemically bonded to the nitrogen or oxygen, will act as very good diffusion barriers and thus capping layer materials.

Figure 3D:
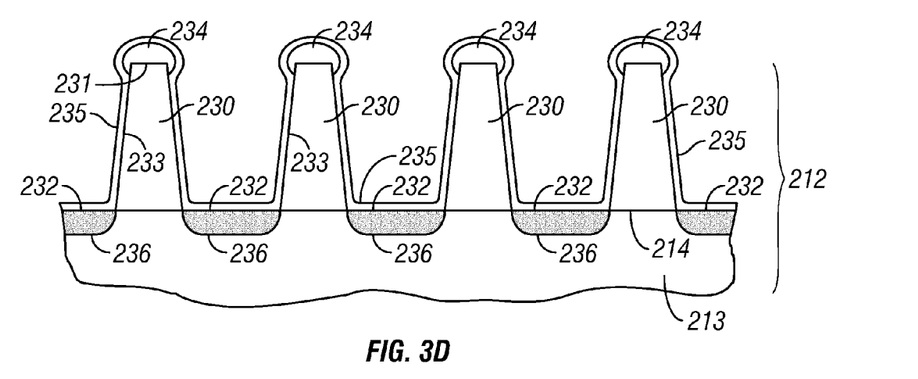

The capping layer 235 may have a thickness in the range of about 1 to 5 nm. The capping layer 235 should cover at least the recording layer material 234 in the trenches 232. The capping layer may also cover the sidewalls 233 and the recording layer material 234 on the ends 231 of pillars 230, as shown in FIGS. 3C and 3D. This may be accomplished by deposition of the capping layer material at an angle inclined to the substrate surface normal while the substrate is being rotated. With the capping layer 235 thoroughly covering both the trenches 232 and the sidewalls 233, the Si or Ge has no chance to break through to the surface during annealing, even at the edges where the trenches and sidewalls meet. A protective overcoat (not shown), such as an amorphous "diamond-like" carbon film or a silicon-nitride film, may be formed on top of the capping layer 235.

In this invention the structure of FIG. 3C is annealed. This results in the structure depicted schematically in FIG. 3D, wherein the magnetic recording layer material in the trenches 232 and the material of diffusion layer 213 diffuse together and chemically react. This creates nonmagnetic regions 236 at the surface 214 in the trenches 232. However, the capping layer 235 remains intact and does not substantially chemically react with the material of diffusion layer 213 and thus prevents any Si surface diffusion onto the pillars. The material of the recording layer 234 includes at least one element selected from the group consisting of Co, Fe, Pt, Pd, Ni and at least one of these elements reacts with the material of the diffusion layer 213. The annealing results in the destruction or at least substantial reduction of any ferromagnetism in the nonmagnetic regions 236, meaning that these regions exhibit no significant magnetic moment after exposure to an applied magnetic field. This eliminates or substantially reduces readback noise originating from the domain structure in the trenches.

However, the annealing does not significantly modify the ferromagnetic properties of the recording layer 234 on the ends 231 of pillars 230 because the pillars 230 are formed of non-diffusion material, such as SiN or $SiO_2$. For example, if the recording layer material includes Co and the diffusion layer 213 comprises Si or Ge, then the nonmagnetic regions 236 would include the non-ferromagnetic compound $Co_2Si$ or $Co_2Ge$, respectively. Depending on the elements in the magnetic recording layer material and the composition of the diffusion layer, other possible non-ferromagnetic compounds that may be formed include $Fe_3Si$, $Fe_3Ge$, and a range of metastable crystalline and amorphous alloys. The diffusion of Si and Ge with ferromagnetic Co and Fe to render magnetic regions nonmagnetic is known. For example, U.S. Pat. No. 5,585,140 describes manufacturing a discrete-track magnetic recording disk for longitudinal recording by first patterning the continuous magnetic film with concentric rings of Si or Ge and then annealing to create a planar surface of concentric magnetic data tracks separated by concentric nonmagnetic rings.

The annealing time and temperature can be determined experimentally, depending on the materials for the recording layer and diffusion layer and the thickness of the recording layer material. In one example, a Co/Pd multilayer of 8 alternating films with a total thickness of 11 nm was deposited on a single-crystal silicon wafer. Annealing at 260° C. for 10 minutes completely destroyed ferromagnetism in the multilayer. By comparison, when the same multilayer was formed on a 1.5 nm thick Ta non-diffusion layer on a single-crystal silicon wafer and annealed at the same temperature for the same time, no effect on the ferromagnetism of the multilayer could be detected.

Figure 4:
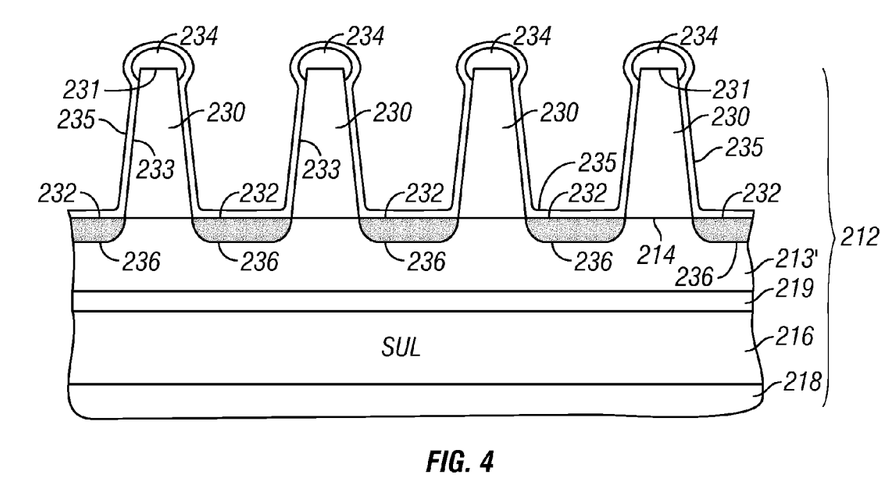
FIG. 4 is a sectional view of an embodiment of the invention similar to that depicted in FIG. 3D but wherein the substrate includes a soft underlayer (SUL).

FIG. 4 is a sectional view of an embodiment of the invention similar to that depicted in FIG. 3D but wherein the substrate 212' includes a SUL 216. The SUL 216 is formed on the substrate rigid support structure or base 218. The SUL 216 may be a single layer formed of magnetically permeable materials, such as alloys of CoNiFe, FeCoB, CoCuFe, NiFe, FeAlSi, FeTaN, FeN, FeTaC, CoTaZr, CoFeTaZr, CoFeB, and CoZrNb, or a laminated structure formed of multiple soft magnetic films separated by nonmagnetic films, such as electrically conductive films like Al and CoCr or antiferromagnetic coupling films like Ru and Ir. The base 218 may be any commercially available glass disk blank, but may also be a conventional aluminum alloy with a NiP surface coating, or an alternative disk blank, such as silicon, canasite or silicon-carbide. An optional adhesion layer (not shown) for the growth of the SUL, such as an AlTi alloy, may be formed on base 218 before deposition of the SUL 216.

As shown in FIG. 4, a diffusion barrier 219, which may be any material like that used for the pillars 230 or the capping layer 235, is formed above the SUL 216. For example, a 1.5 nm thick Ta layer may serve as the diffusion barrier 219. In this embodiment the diffusion layer 213' is formed on the diffusion barrier 219 and may be a layer of sputter-deposited amorphous Si or Ge. During the annealing the diffusion barrier 219 prevents diffusion between the magnetic material in the SUL 216 and the material in the diffusion layer 213'.

Figure 5A:
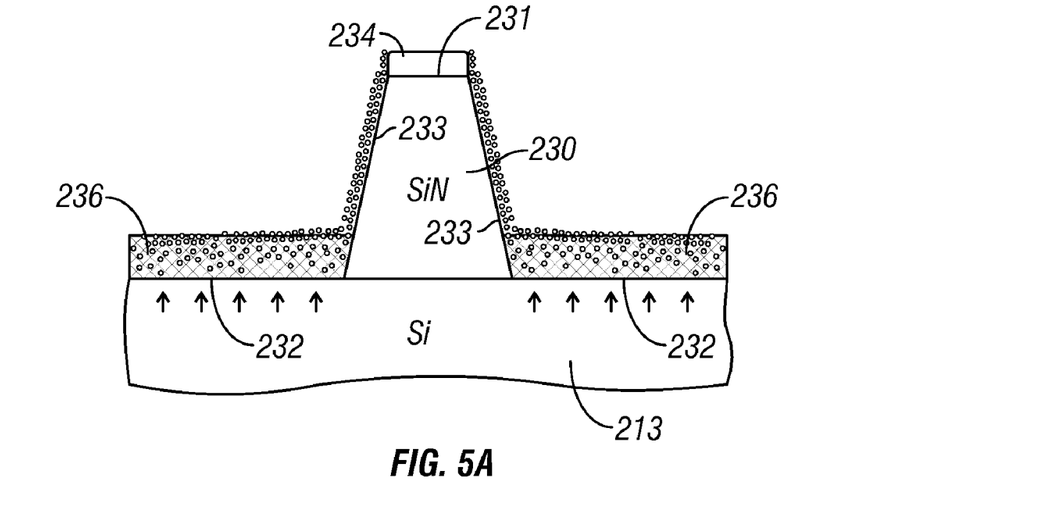
FIG. 5A is a schematic illustration of the annealing process without the capping layer.

FIG. 5A is a schematic illustration of what may occur during annealing without capping layer 235 for an example where the material in diffusion layer 213 is Si and the pillars 230 are formed of SiN non-diffusion material. During annealing the Si in trenches 232 will diffuse (as shown by the arrows) into the recording layer material in trenches 232. The Si will react with one or more of the elements in the recording layer material to form nonmagnetic regions 236, represented by cross-hatching. However, if the time and temperature of the anneal are not precisely controlled, some of the Si (represented by the circles), may diffuse completely to the surface and migrate along the sidewalls 233 of the pillars 230 to the recording layer material 234 on the tops 231 of the pillars 230. The Si will chemically react with the material in the recording layer 234 to cause the formation of undesired nonmagnetic regions on the tops 231 of the pillars 230.

Figure 5B:
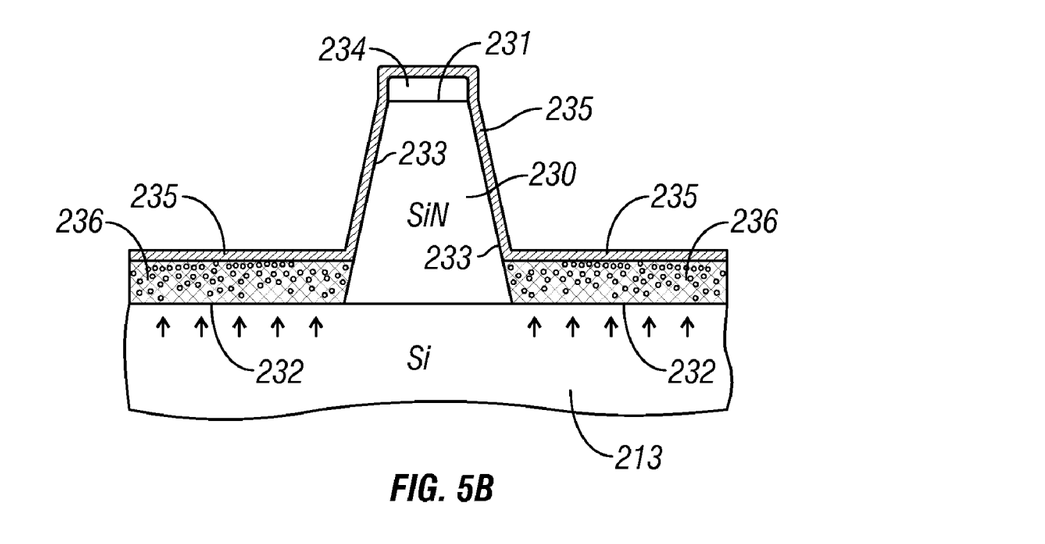
FIG. 5B is a schematic illustration of the annealing process with the capping layer according to the invention for comparison with FIG. 5A.

FIG. 5B is a schematic illustration of the annealing process with the capping layer 235 for comparison with FIG. 5A. The capping layer 235 suppresses the diffusion of the Si to the surface in the trenches 232. Because the Si cannot reach the surface it is not mobile and can not migrate along the pillar sidewalls 233. The capping layer 235 eliminates the need for precise control of the annealing process and enables the annealing to be at higher temperatures and/or for longer times.

Figure 6A:
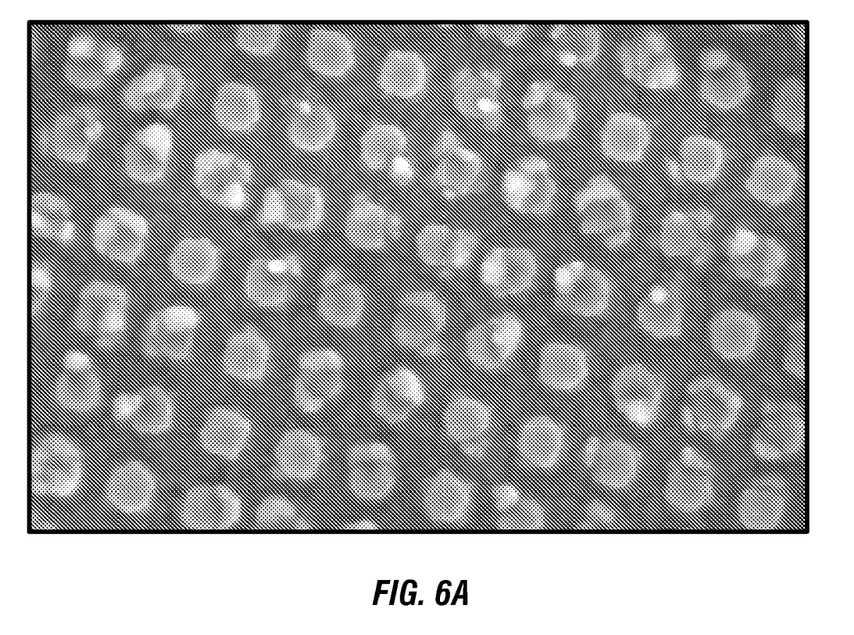
FIG. 6A is a scanning electron microscope (SEM) image showing the magnetic islands and the nonmagnetic trenches after annealing without a Ta capping layer.
Figure 6B:
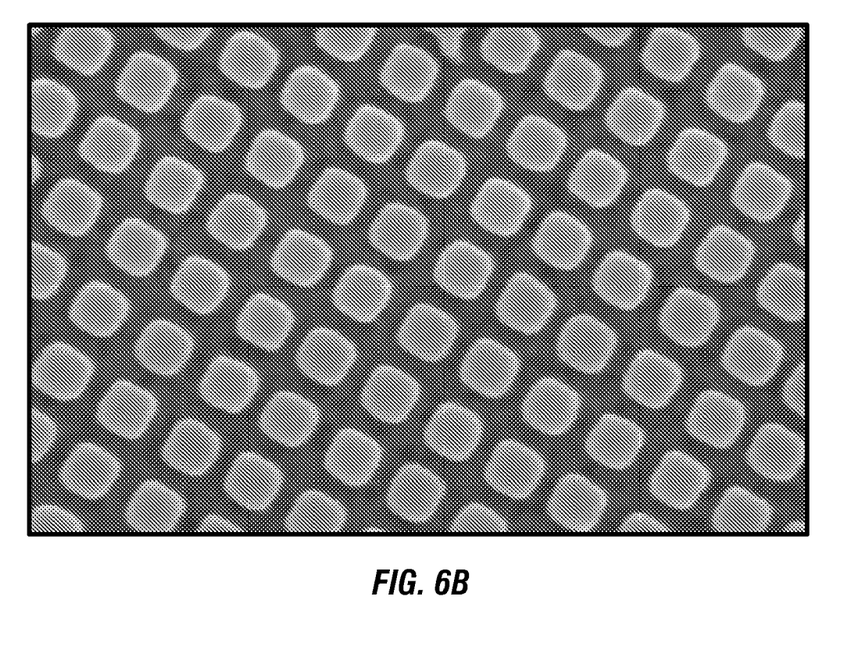
FIG. 6B is an SEM image showing the magnetic islands and the nonmagnetic trenches after annealing with a Ta capping layer according to the invention.

FIGS. 6A-6B are scanning electron microscope (SEM) images of 40 nm high SiN pillars on a Si wafer with 50 nm island width on a 100 nm pitch (i.e., the spacing between the centers of the pillars in FIGS. 6A-6B is 100 nm). The prepatterned substrate, including the pillar ends, was covered with a Co/Pd multilayer. FIG. 6A is the image without a Ta capping layer after annealing at 250° C. for 10 minutes, which was sufficient to obtain 100% trench poisoning, i.e., formation of nonmagnetic regions in the trenches. FIG. 6B is the image with a 1.5 nm Ta capping layer after annealing at 275° C. for 10 minutes, which was sufficient to obtain 100% trench poisoning. The images show that without the Ta capping layer the pattern is more irregular and less clean with crystallite formation of Pd silicides on many islands. With the Ta capping layer the islands retain their smooth surfaces and full magnetic moment and the trenches appear clean with smooth surfaces.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A patterned magnetic recording medium comprising:
   a substrate comprising material and having a generally planar surface and a plurality of spaced-apart pillars extending generally perpendicularly from said surface, the pillars having sidewalls and ends;
   a recording layer having perpendicular magnetic anisotropy on the ends of the pillars, the recording layer being formed of a material comprising one or more elements selected from the group consisting of Co, Fe, Pt, Pd and Ni;
   nonmagnetic regions at said surface between said pillars, said nonmagnetic regions comprising a compound of at least one of said recording layer elements and at least one element from the material of said substrate; and
   a capping layer on said nonmagnetic regions and the sidewalls of said pillars, the capping layer being formed of a material not substantially chemically reactive with the substrate material.

2. The medium of claim 1 wherein the capping layer is also directly on the recording layer on the ends of the pillars.

3. The medium of claim 1 wherein the capping layer comprises a material selected from the group consisting of Ta, W, Mo, Nb, Re, and their alloys.

4. The medium of claim 1 wherein the capping layer comprises a material selected from the group consisting of amorphous diamond-like carbon, alumina, silicon nitrides, and silicon oxides.

5. The medium of claim 1 wherein the substrate comprises a material selected from Si and Ge.

6. The medium of claim 5 wherein the substrate comprises a silicon wafer.

7. The medium of claim 5 wherein the substrate comprises a rigid base and a layer of amorphous Si on the base.

8. The medium of claim 7 wherein the substrate further comprises an underlayer of a soft magnetically permeable material on the base and a diffusion barrier between the underlayer and the amorphous Si layer.

9. The medium of claim 8 wherein the underlayer material comprises an alloy selected from the group of alloys consisting of CoNiFe, FeCoB, CoCuFe, NiFe, FeAlSi, FeTaN, FeN, FeTaC, CoTaZr, CoFeTaZr, CoFeB, and CoZrNb.

10. The medium of claim 1 wherein the recording layer comprises a multilayer of alternating layers of a first material and a second material, the multilayer being selected from the group of multilayers consisting of Co and Pt, Co and Pd, Co and Ni, Fe and Pt, and Fe and Pd.

11. The medium of claim 1 wherein the recording layer material comprises a granular Co alloy.

12. The medium of claim 11 wherein the recording layer material further comprises an oxide of one or more of Si, Ta, Ti, Nb, Cr, V and B.

13. The medium of claim 1 wherein the recording layer material comprises a chemically-ordered alloy selected from the group consisting of CoPt, CoPd, FePt and FePd.

14. The medium of claim 1 wherein the medium is a magnetic recording disk and wherein the pillars are arranged on the substrate in a plurality of generally concentric circular tracks.

15. A method for making a patterned perpendicular magnetic recording medium comprising:
   providing a substrate comprising a material selected from Si and Ge and having a generally planar surface and a plurality of pillars extending generally perpendicularly from said surface, the pillars having sidewalls and ends and being spaced-apart on said surface to define trenches between the pillars at said surface;
   depositing a layer of perpendicular magnetic recording material on the pillar ends and in the trenches, the recording layer material comprising one or more elements selected from the group consisting of Co, Fe, Pt, Pd and Ni;
   depositing a capping layer directly on the recording layer material in the trenches and on the sidewalls of the pillars, the capping layer being formed of material not substantially chemically reactive with said selected Si or Ge; and
   after depositing the capping layer, heating the substrate to cause the selected Si or Ge to chemically react with at least one of said recording layer elements in the trenches.

16. The method of claim 15 wherein depositing the capping layer comprises depositing the capping layer directly on the recording layer material on the ends of the pillars.

17. The method of claim 15 wherein depositing the capping layer comprises depositing the capping layer at an angle inclined to the substrate surface normal while rotating the substrate about an axis parallel to the substrate surface normal.

18. The method of claim 15 wherein depositing the capping layer comprises depositing a layer of material selected from the group consisting of Ta, W, Mo, Nb, Re, and their alloys.

19. The method of claim 15 wherein depositing the capping layer comprises depositing a layer of material selected from the group consisting of amorphous diamond-like carbon, alumina, silicon nitride, and silicon oxides.

* * * * *